July 5, 1938.  E. W. KRUEGER  2,123,112
CAMERA FLASHLIGHT SYNCHRONIZER
Filed April 28, 1937  2 Sheets-Sheet 1
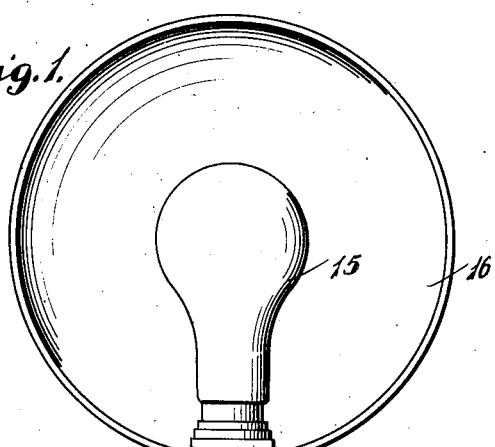
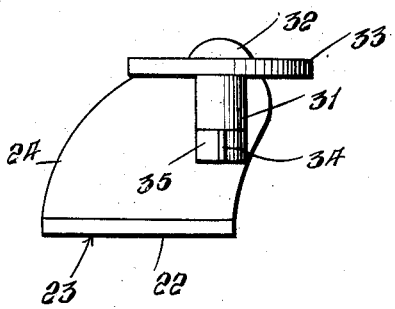
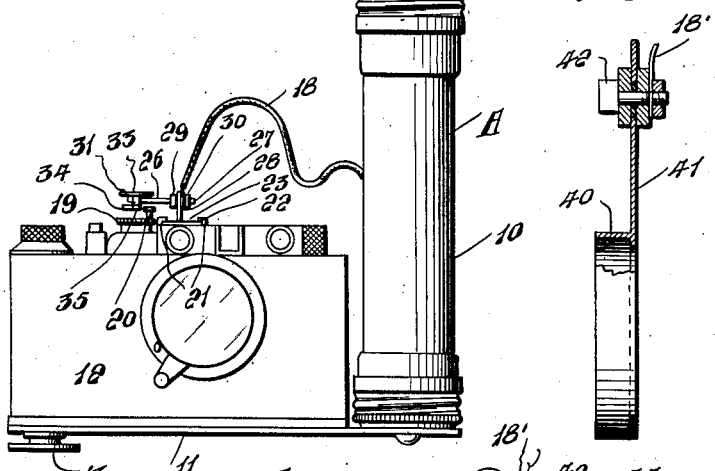
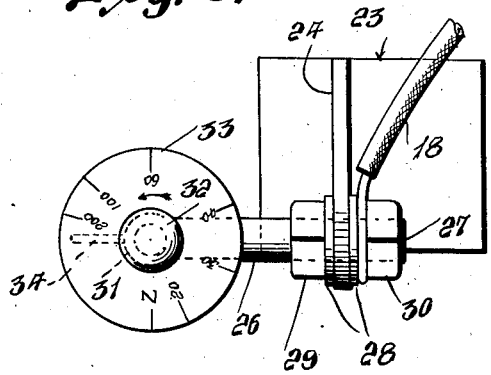
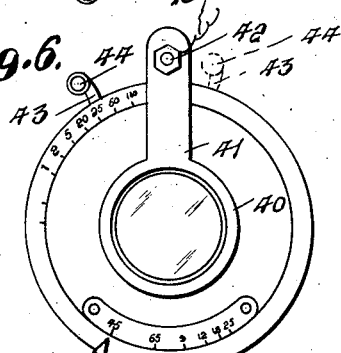
Inventor
E. W. Krueger
By L. F. Randolph
Attorney

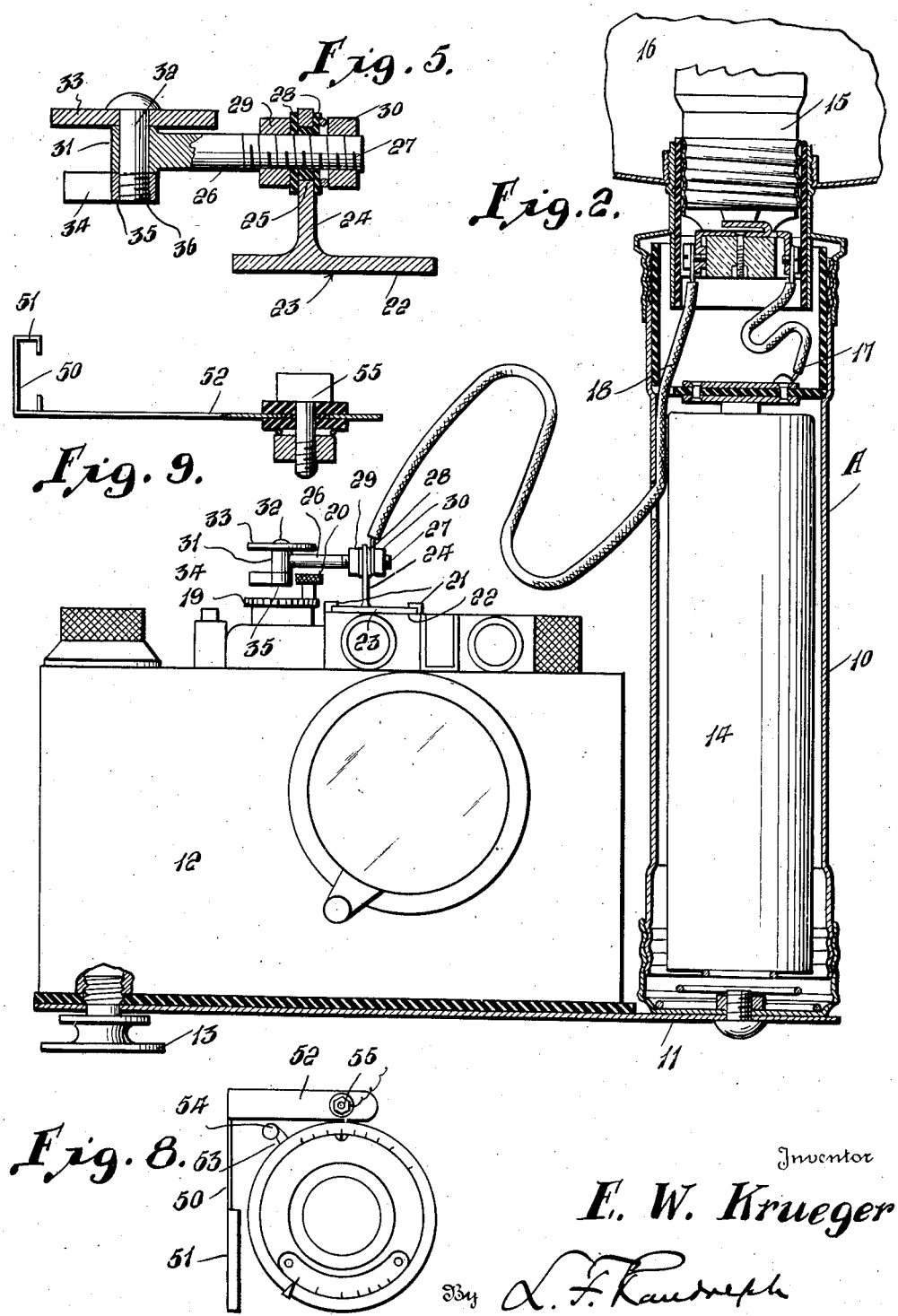

Patented July 5, 1938

2,123,112

UNITED STATES PATENT OFFICE 2,123,112

CAMERA FLASHLIGHT SYNCHRONIZER

Elton W. Krueger, Monterrey, Mexico

Application April 28, 1937, Serial No. 139,620

3 Claims. (Cl. 67—29)

This invention relates to a synchronizing attachment or mechanism for cameras or photographic apparatus and it aims to provide a novel apparatus dependent on and operable through motion of the shutter itself, to generally simplify such structures as a result and particularly avoid a construction which is linked mechanically to the shutter release button, or requires intervention of the human element, and the attendant objections and uncertainties.

The more specific objects and advantages will become apparent from a consideration of the description following taken in connection with accompanying drawings illustrating an operative embodiment.

In said drawings:—

Figure 1 is a front elevation of one form embodying my improvements;

Figure 2 is a view of the parts of Figure 1, on a larger scale, and primarily in vertical section;

Figure 3 is a plan view of the synchronizing unit alone;

Figure 4 is an end elevation of such unit looking from the left of Figure 3;

Figure 5 is a substantially central longitudinal sectional view through the said unit;

Figure 6 is a front elevation of a modified form;

Figure 7 is a vertical sectional view through said modified form;

Figure 8 is a front elevation of a second modified form, and

Figure 9 is a view in plan, and partly in section, of such second modified form.

Referring specifically to the drawings, a flashlight structure generally of conventional form is shown at A. It has a casing 10 connected to a metallic base plate 11 which also supports a camera 12, specifically shown as a Leica, although it may be of any desired type. The camera is connected to the plate by means of a screw 13 fitting the tripod bushing of such camera 12.

An electric battery 14 is located within the casing 10 and has one terminal grounded thereto. The flash bulb is shown at 15 in coacting relation with a reflector 16. Such bulb may be of any preferred type, for instance having a magnesium salt adapted to be ignited through the closing of an electric circuit therethrough from battery 14. Conductors 17 and 18 connect the flash bulb with the battery. It will be understood that the camera 12 has metallic parts grounded to the plate 11 and which include the usual timing disc 19 for the shutter of the camera. Such timing disc according to my invention is equipped with a contact or electrode 20 which may be a metallic screw, screw threaded thereto.

Also in accordance with my invention, the usual accessory clips 21 on the camera casing are slidably and detachably engaged by the foot 22 of a bracket 23 from which a post or wall 24 rises. Said post has an opening therethrough surrounded by a ring 25 of insulation and adjustably extending through said ring is a shaft 26 having screw threads 27. Discs 28 of insulation engage opposite sides of the post 24 and nuts 29 and 30 are tightened on the threads 27 and against said discs or washers 28, the conductor 18 being clamped against the shaft 26 by means of the nut 30.

Said shaft 26 has a vertically disposed tubular portion 31 through which a bolt 32 is rotatable but held frictionally against accidental turning. Rigid on said bolt is a disc 33. A contact 34 is provided with a nut 35 engaging screw threads 36 on said bolt 32, said contact and disc being on opposite sides of the tube or sleeve 31.

Said contact 34 is arranged so that it will be engaged by the contact 20 and the timing disc 19 of the shutter of the camera 12. When such contact occurs, an electric circuit is closed through the battery 14 and the flash bulb.

Attention is called to the fact that the disc 33 is preferably calibrated on its upper surface in the same manner that the timing disc 19 is calibrated, thus enabling the calibrations to be used in adjusting or setting the contact 34 at any desired position or angle with respect to the contact 20.

As a result of the construction described, it will be realized that the synchronization is effected by a part in effect of the shutter mechanism, avoiding complicated electrical switch means mechanically linked to the shutter release button requiring very difficult and exact adjustment and in addition resort to the human element.

By the present construction, the bulbs do not have to be fired to determine by trial whether the flash occurs at the proper time.

It is to be understood that the construction described is by way of example only and that various changes may be resorted to within the spirit, scope and principle of the invention. For instance, for cameras of the type such as the "Compur", the flashlight synchronizer consists of a metallic ring 40 which slips friction tight over the lens mounting of that camera. Such ring 40 has an arm 41 extending therefrom which supports an electrical binding post and contact 42 to which a conductor 18', like that in the first form of the invention at 18, is fastened. Ring 40 is grounded to the camera and the shutter winding lever of the latter is shown at 43. The ring 40 supports the contact 42 in a position directly over such shutter winding lever and the latter has a contact 44 thereon. After said winding lever 43 is set or wound for an exposure, the synchronizer contact 42 is so placed that when the timing lever is put in motion clipping the shutter, it touches the stationary contact 42, thus closing the circuit to the battery 14, as in the first form of the invention and thereby igniting the magnesium of the flash bulb 15.

When the camera is focused by turning the lens mount itself, as in the case of a "Korelle" or like camera, the synchronizer system is modified as shown in Figures 8 and 9. A bracket 50 is employed having a clamp portion 51 which clamps or clasps on the lens supporting post of the camera. A tongue 52 extends toward the shutter winding lever 53 carrying a contact 54 at 44. Tongue 52 carries a binding post and contact 55 to which a conductor like that at 18' is connected.

These contacts 54 and 55 are connected in the electric circuit means as in the first form of the invention and the circuit is adapted to be closed to ignite the flash bulb through the contact 54 touching the contact 55.

I claim as my invention:—

1. In combination with a camera having a shutter mechanism including a movable element provided with a contact, a contact on the camera engageable by the first contact, a flashlight unit including a battery having one side connected to one contact and the other side connected to the other contact, a slidably adjustable bracket on the camera, a shaft carried by the bracket, an element carried by the shaft rotatable on an axis at an angle to the longitudinal axis of the shaft, said element carrying the second mentioned contact.

2. In combination with a camera having a shutter mechanism including a movable element provided with a contact, a contact on the camera engageable by the first contact, a flashlight unit including a battery having one side connected to one contact and the other side connected to the other contact, a slidably adjustable bracket on the camera, a shaft carried by the bracket, an element carried by the shaft rotatable on an axis at an angle to the longitudinal axis of the shaft, said element carrying the second mentioned contact, a disc carried by said element to coact with the shutter mechanism to set the position of the second mentioned contact.

3. In combination with a camera having a shutter mechanism including a movable element provided with a contact, a contact on the camera engageable by the first contact, a flashlight unit including a battery having one side connected to one contact and the other side connected to the other contact, a bracket having a plate-like base, clips on the camera adjustably mounting said base, a wall rising from the base intermediate the side edges thereof, a shaft insulated from the wall and adjustably fastened transversely thereof, said shaft extending laterally beyond the base and at its free end having a sleeve at a right angle to its longitudinal axis, an element rotatably mounted by said sleeve, said element carrying the second mentioned contact.

ELTON W. KRUEGER.